June 22, 1965 A. W. BUCK 3,191,032
X-RAY FILM CASSETTE
Filed March 11, 1963 2 Sheets-Sheet 1

Arthur W. Buck
INVENTOR

BY Jacobi & Davidson
ATTORNEYS

June 22, 1965  A. W. BUCK  3,191,032
X-RAY FILM CASSETTE
Filed March 11, 1963  2 Sheets-Sheet 2
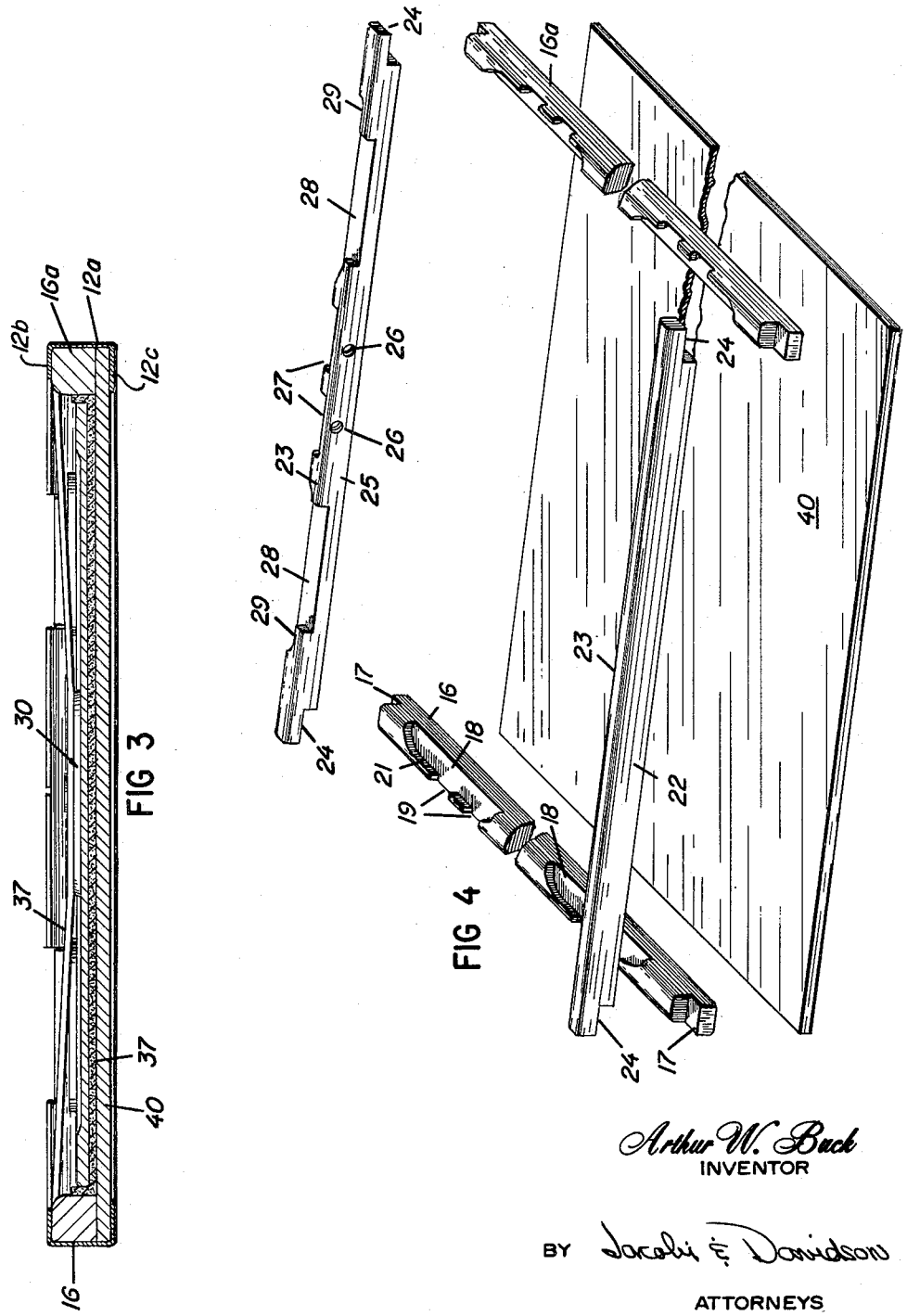
Arthur W. Buck
INVENTOR
BY Jacobi & Davidson
ATTORNEYS

3,191,032
X-RAY FILM CASSETTE
Arthur W. Buck, 8709 Xograph Ave., St. Louis, Mo.
Filed Mar. 11, 1963, Ser. No. 264,247
3 Claims. (Cl. 250—68)

The present invention relates to a film cassette for holding radiographic film, and more particularly to such a film cassette having a frame with non-reflective interior surfaces and a front panel with improved dimensional stability.

Medical X-ray pictures are made by exposing an appropriate film to X-rays which have passed through a desired object, such as a part of the human anatomy. The film is held in a cassette, and cassettes are typically made up of a front panel held by a frame, a back which is hinged to the frame, flat-strip spring locks which are pivotally mounted on the back and a felt cushion which is secured to the interior of the back. An example of such a cassette is shown in Patent No. 1,997,557 issued to A. W. Buck on April 9, 1935.

In using the film cassette, the X-ray film is placed between the front panel and the felt cushion attached to the back, and between intensifying screens. It is most important that the film have perfect contact with the two intensifying screens, and that there be no leakage of light into the cassette so as to fog the film. While these requirements are known, cassettes now in use are often made of a welded construction, and the heat necessary to the welding process often warps the cassette frame, thus resulting in warpage of the front panel and consequent failure of the cassette to provide the complete and perfect contact between the film and intensifying screens. In some instances, the frame is even heat treated after manufacture in order to eliminate any buckling or warpage, but experience has shown that despite this heat treatment the buckling or warpage eventually results in defective film-to-screen contact. In addition to the above deficiency in cassettes now in use, it has been found that after an extended period of use they are subject to light leakage. This results from the standard construction of these cassettes in which the felt cushion which is secured to the inner side of the cassette back is made somewhat larger than the cassette back, so that the felt cushion extends into the space between the outer edges or perimeter of the back and the inner sides of the frame. Thus, the felt cushion serves not only to assist in obtaining a proper contact between the film and the screens, but also serves to block the entry of light to the film through the space between the cassette frame and the cassette back. During use, the extending part of the felt cushion is subjected to a shearing action between the edges of the cassette back and the cassette frame, so that the felt cushion is gradually worn thin and eventually permits light to leak to the film. This light leakage, entering the cassette between the frame and the cassette back is somewhat assisted, in known cassettes, by the fact that the frame is made of materials which are highly light-reflective, such as stainless steel. This material is used, of course, because of its great strength, and because it permits the building of a cassette which is not only sufficiently strong, but which is within the thickness limitations imposed by the equipment with which the cassette is used; such thickness limitations are commonly embodied in published standards and specifications.

It has been suggested that shearing of the felt cushion could be reduced by rounding off or beveling the edge of the cassette back, which is typically a plate of steel or aluminum. This has not proven effective as a solution to the problem because such modification of the plate would require that the plate thickness be increased in order to provide the necessary strength, but such an increase in the plate thickness is unsatisfactory as this would result in an unacceptable increase in the overall thickness of the cassette. It has also been suggested that the frame could be painted to reduce light reflection, but such a proposal is unsatisfactory because the paint will not adhere to the frame for an extended length of time without chipping.

The front panel of a film cassette is commonly made of Bakelite, this being the most popular of several acceptable materials. The Bakelite panel has not, heretofore, contributed to the dimensional stability and strength of the cassette, as it was spaced inwardly from the frame portions which extend perpendicularly to the plane of the cassette. This was necessary because the cassettes are subject, during tests and during use, to environments containing high humidity, and such humidity is absorbed by the Bakelite and causes it to swell or expand.

An object of the present invention is to provide a film cassette which is light proof and which will remain light proof through extended use.

Another object of the present invention is the provision of a film cassette in which shearing of the felt cushion is greatly reduced.

Yet another object of the present invention is the provision of a film cassette having a strong, warp-free frame having a non-reflective interior surface.

A further object of the present invention is the provision of a film cassette which will fulfill the above description and which will be within acceptable size limitations.

A still further object of the present invention is to provide a film cassette in which a front panel comprising Bakelite or the like contributes to the structural stability of the cassette.

Other objects and many of the attendant advantages of the present invention will be apparent from the following description taken in conjunction with the accompanying drawings, wherein:

FIG. 3 is a cross sectional view, slightly reduced, taken on the line 3—3 of FIG. 1.

FIG. 4 is a perspective view of the cassette front panel and bar members forming a part of the frame.

Figures 1, 2:
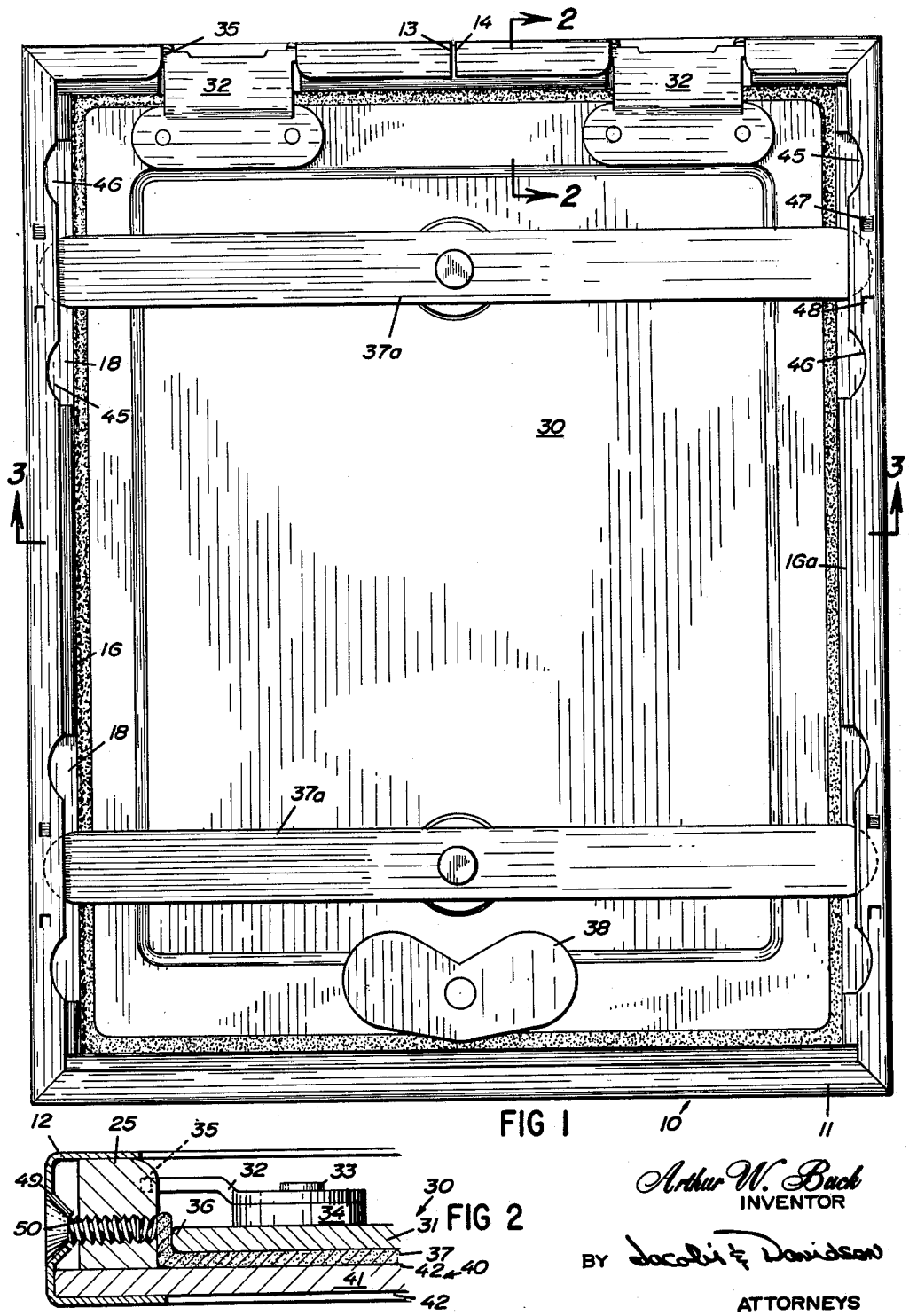
FIG. 1 is a rear elevation of a cassette in accordance with the present invention.
FIG. 2 is a fragmentary section taken on the line 2—2 of FIG. 1.

Turning now to the drawings, wherein like or corresponding reference numerals are used to designate like or corresponding parts throughout the several views, there is shown in FIG. 1 a film cassette in accordance with the present invention generally designated 10, comprising a rectangular frame 11 and a back 30. Frame 11 comprises a peripherally extending generally C-shaped channel 12, as may be seen in FIG. 2. Channel 12 is preferably a single element having its ends 13, 14 in closely spaced relationship. The channel 12 has a web 12a which interconnects its legs 12b and 12c, as shown in FIGURE 3. Within the channel 12 are side and end bar members which may best be seen in FIG. 4, wherein there is shown the side bar members 16 and 16a, these members being identical. Side bar member 16 has upwardly facing notches 17 at the ends thereof, and along the upper surface, intermediate the ends thereof, there are spaced recesses 18 for receiving the ends of the spring locks. Grooves 19 extend into the recesses 18 through a rear wall 21 which is defined by the recess 18 for a purpose to be hereinafter described.

An end bar member 22 is of generally elongate shape and of substantially rectangular cross section, except that the edge 23 thereof is beveled. Notches 24 are provided in the ends of the end bar member 22 to cooperate with notches 17 in the side bar members 16, 16a.

End bar member 25 is generally similar to end bar member 22, having a beveled edge 23 which is, as is the case with end bar member 22, the inner, upper edge of the member when assembled in the cassette. Also, end bar member 25 is provided with notches 24. End bar member 25 is provided with a pair of holes 26 which are threaded and which communicate with recesses 27 in the outer face of bar member 25. There are also provided a pair of spaced recesses 28 having end extensions 29.

The back 30, as may be seen in FIGS. 1 and 2, comprises a back plate 31 having hinge straps 32 secured to it by the rivets 33. Hinge straps 32 have spacer elements 34 between them and the back plate 31, and are provided with pin elements 35. The hinge straps 32 extend into the recesses 28 in the end bar member 25, and the hinge pin elements 35 are received in the extension 29.

It will be observed from FIG. 2 that the edge 36 of back plate 31 is beveled, and this is done to avoid shearing of the felt cushion 37 which is suitably secured, as by adhesive, to the inner side of back plate 31.

Back plate 31 has pivotally secured to it a pair of flat-strip spring locks 37a. A suitable pull element 38 is also secured to the back plate 31.

The front panel 40 of cassette 10 comprises a Bakelite sheet 41 having thin sheets of aluminum 42 adhered to the faces thereof, as shown in FIG. 2. These aluminum sheets 42 are extremely thin, about 1/1000 of an inch each, and serve as a vapor barrier for Bakelite sheet 41. Thus, sheet 41 is not subject to swelling, and is therefore dimensionally stable. It consequently may cooperate with channel 12 by extending into contact with the leg 12c thereof as shown in FIG. 3. This enables the front panel 40 to add to the structural strength of cassette 10 by reinforcing the frame 12 and preventing racking thereof.

Referring again to frame 11, the channel 12 is provided, as shown in FIG. 1, with a pair of notches 45, 46 above each of the recesses 18 in the side bar members 16, 16a, to receive the ends of the spring locks 37a. Channel 12 is also provided with a pair of struck out tongues 47, 48 between the notches 45 and 46, these tongues having their free ends adjacent. As shown in FIG. 2, the channel 12 has an apertured depression 49 to receive the head of a screw 50, it being understood that there are two such depressions 49 and two screws 50.

The channel 12 is made of suitably strong material, stainless steel being preferred. It is, as noted, a single piece, and so welding of the cassette is avoided. The side bar members 16, 16a and end bar members 22 and 25 are of aluminum or magnesium, and in order to avoid light reflection, these members are anodized, preferably on all exposed surfaces, those visible when the back is in open position, and at least on the surfaces thereof which face toward the back plate 31. This is, as will be understood, the surfaces which are contacted by the felt cushion 37 when the cassette 10 is closed. The anodizing is preferably dull black, to provide a non-reflective, light absorbing surface.

In assembling the cassette 10, the channel 12 is in a somewhat open position, with at least some of the corners having angles somewhat more than 90 degrees. The front panel 40 is placed within the channel 12, and the end bar member 22, the side bar member 16, 16a and the end bar member 25 are placed on the front panel 40 and positioned generally at the edges thereof. Also, end member 25 is placed in position, and as will be understood the notches 17 and 24 in the bar members will permit cooperative engagement thereof. The side portions of channel 12 are then brought into position so that the two corners which are adjacent in the bar member 22 each forms a right angle. The tongues 47 and 48 in channel 12 pass through the grooves 19 in the side bar members 16, 16a, the grooves 19 being provided for this purpose. The hinge pins 35 are placed in the extensions 29, with the hinge straps 32 in the recesses 28 of end bar member 25, and the two free ends 13 and 14 of channel member 12 are brought into position, screws 50 then being inserted through the holes in channel 12 which are in alignment with the holes 26 in end bar member 25, the depressions 49 in channel 12 entering into the recesses 27 in the end bar member 25. The screws 50 are then threaded into position, and the assembly is completed. It will be understood that the dimensions of front panel 40 are carefully chosen so that front panel 40 serves to limit the movement of the portions of channel 12 from the initial open position above referred to. The front panel 40 rests upon the leg 12c and its edges about the web 12a. The side bar members 16, 16a and the end bar members 22 and 25 extend between the rear of the front panel 40 and the leg 12b.

The spring lock 37a is rotated, when the back 30 is in the closed position shown in FIG. 3 so that the ends thereof overlie a pair of the notches 45 or 46. The ends are then depressed through these notches, and are received in the recesses 18 in the side bar members 16, 16a. Upon release of the spring locks 37a when in the position shown in FIG. 1, accidental displacement or rotation thereof is prevented by the tongues 47 and 48, it being understood that opening of the spring locks may be effected by depressing the ends thereof so as to pass beneath one or the other of the tongues 47 or 48.

During use of the cassette 10, the repetitious opening and closing of the cassette back 30 will not, as heretofore, shear the felt cushion so as to reduce its thickness where it extends between the back plate and the frame. This is due to the fact that the edge 36 of back plate 31 is beveled and also due to the fact that the upper, inner edges of the side and end bar members are also beveled, as at 23. In addition, the exposed surfaces of the end bar members and side bar members are non-reflecting, having a dull black, light absorbing surface finish, by anodizing, and thus prevent the fogging of film by light reflected from these bar members.

There has been provided a film cassette for radiographic film which is extremely strong and durable, remaining light proof throughout a greatly extended period of use. The cassette of the present invention provides for greatly reduced shearing and wearing of the felt cushion, substantial elimination of light reflection which has heretofore caused film fogging, and has achieved these results without exceeding commercially significant thickness limitations. Further, the cassette herein disclosed has a strong, warp-free frame providing excellent contact between the film and intensifying screens throughout a long period of use of the cassette.

There has also been provided a film cassette which has a front panel comprising Bakelite which substantially contributes to the overall strength and stability of the cassette by its unique construction and unique cooperation with the cassette frame.

It will be obvious to those skilled in the art that various changes may be made without departing from the spirit of the invention and therefore the invention is not limited to what is shown in the drawings and described in the specification but only as indicated in the appended claims.

What is claimed is:

1. A cassette comprising:
   a frame formed of a generally C-shaped channel which defines the perimeter of the cassette;
   said channel having first and second inwardly extending leg portions which are spaced from one another by a web;
   a laminated front panel having a central Bakelite sheet with moistureproof layers adhered to the forward and rear surfaces thereof;
   a back member;

hinge means movably securing said back member to said frame first leg portion;

said front panel being mounted within said frame with its forward surface abutting against said second leg portion;

side and end bar members disposed with said frame channel and extending between said first leg portion and the rear surface of said front panel;

said side bar members having recesses therein beneath first leg portion;

at least a pair of leaf spring members rotatably attached to said back member;

said leaf spring members being rotatable to a position whereat the ends thereof project into said recesses and beneath said first leg portion to thus prevent said back member from being pivoted about said hinge means to an open position;

said leaf spring members also being rotatable to a position whereat the ends thereof are out of said recesses to thus permit said back member to be pivoted to an open position;

said side and end bar members having dull, light absorbing anodized surfaces on the portions thereof which are visible when said back member is pivoted to an open position.

2. A cassette as defined in claim 1 wherein said bar members are fabricated of aluminum.

3. A cassette as defined in claim 1 wherein said bar members are fabricated of magnesium.

References Cited by the Examiner
UNITED STATES PATENTS

| | | | |
|---|---|---|---|
| 2,213,437 | 9/40 | Wolf | 250—68 |
| 2,298,587 | 10/42 | Raffman | 250—68 |
| 2,340,378 | 2/44 | Grobe | 250—68 |
| 2,590,892 | 4/52 | Reuter | 250—68 |
| 2,812,441 | 11/57 | Kamiss | 250—68 |
| 2,878,389 | 3/59 | Raffman | 250—68 |

RALPH G. NILSON, *Primary Examiner.*